3,056,678
PROCESS FOR MAKING BAKED PRODUCTS
CONTAINING FATTY FILLINGS
Kurt Pentzlin, Ebellstrasse 18,
Hannover-Kleefeld, Germany
No Drawing. Filed Jan. 4, 1960, Ser. No. 61
7 Claims. (Cl. 99—86)

This invention concerns the manufacture of baked products or the like containing fatty fillings or dressings.

In the past fatty fillings or dressings have been manufactured by the admixture of a fat in the solid state with suitable additional ingredients such as sugar, cocoa powder, milk powder, syrup, flour, starch, flavouring substances and the like. The mixing of the ingredients of the filling has usually been carried out in a kneading machine wherein frictional heat generated by the mixing process has softened the fat to enable easier mixing. This has the advantage that the mixed filling could more easily be placed upon or within the baked product.

The main disadvantages of such a process, however, outweigh the above outlined advantage, the disadvantages lying in the facts that a large amount of driving power is necessary to drive the kneading machine, the machine is large and expensive and can only be used for batch work.

In the usual manner of manufacture, for example, a mixture of say coconut and palm kernel fat requires kneading for ten to fifteen minutes and the filling requires pressing between endless waffle bands (strips of pastry) at approximately 27° C. while it is in the plastic state. In order to enable the endless filled product to be cut up as required for sale the filled product must be cooled and, at present, this involves a long cooling path of, for example, forty to fifty metres, which is travelled in about eight to ten minutes using a cooling temperature of about minus 4° C., the cooling being carried out in a suitably designed tunnel, before the finished product is cool enough, and the filling solid enough to be cut. The temperature at which the product can be cut efficiently is approximately 12° C. specific temperature.

It will be appreciated from the above that the cooling process is intensive and involves specialized technique in order to ensure that a good finished product is made. Up to the present, however, these difficulties have been endured when making waffles by a continuous process.

It is also well known that the characteristics of the fat content may change during the various changes in temperature that the fat has been subjected to if it is solidified by the manufacturer and thereafter molten again. This is particularly noticeable with respect to taste characteristics which normally deteriorate during changes in temperature.

It is the object of the present invention to provide a process which is more rapidly carried out, involves the use of less expensive machinery and does not result in changes in characteristics of the fat content of the filling.

The invention is based upon the appreciation that a fat, especially a coconut or palm kernel fat, is used which at room temperatures is in solid state but which in the mixing process is used in a liquid state and that, if such a fat in such a liquid state is used, the mixing time can be reduced while at the same time the ingredients added to the fat when mixed result in a more homogeneous filling.

A further advantage gained by this appreciation lies in the fact that the number of changes of temperature of the fat are reduced thus enabling the characteristics of the fat to be retained. If a fat is used which was not solidified after producing it by the manufacturer no change of temperature will happen at all, so that the best taste characteristics are obtained.

Other advantages of the proposed process will be evident from the following description.

According to the present invention a process for manufacturing baked products, such as waffles, containing a fatty filling or dressing is characterised in that the filling is mixed using a normally solid fat in a liquid state which is capable of having homogeneously distributed therein other filling components, such as sugar, ground wafers, milk powder, syrup, flour, starch, flavouring, cocoa powder or the like, the filling being poured or spread, whilst still in the liquid but in a supercooled state, shortly before solidifying onto or between strips of the baked product.

When the mixed filling is poured or spread in a supercooled condition it solidifies within a very short time after pouring or spreading. The exact duration of this time, of course, depends on the degree of supercooling.

The invention will be described further, by way of example, with reference to two practical forms thereof.

According to a first practical form of the invention 40 parts coconut fat with a melting point of 30° C., which was not solidified before using, i.e. delivered in bulk in the liquid state by the manufacturer and as such used for the mixing process, is mixed at 33–37° C., preferably at 33° C., with 25 parts sugar, 34 parts ground wafers, (for instance, the ground waste from cutting or sawing waffles), and 1 part cocoa powder. This mixture is super-cooled under stirring under 27° C., e.g. in a cooling machine of the type known as "Votator."

The mixture remains liquid in the subcooled condition and is poured onto a strip of the baked pastry, say a strip of waffle pastry which has been produced in any suitable manner. If desired a further strip of pastry can be laid upon the filling to form in effect a sandwich.

A few seconds after the filling has been poured it solidifies and the sandwich is passed through a cooling tunnel of about ten metres in length, the cooling time being of about two minutes duration and the temperature being 10° C. The temperature at which the filling becomes firm enough for cutting is now 18 to 20° C.

According to a second practical form of the invention the same mixture as described above is supercooled in a cooling machine known as a "Schröder-Kombinator" to 18° C., and thereafter poured onto a strip of waffle pastry as described above. After covering the layer of the filling with a second strip of waffle pastry the filling becomes firm enough for cutting without any further cooling, which, even in this form of the process, can be used if it seems to be desirable.

In the same way a mixture can be supercooled in which instead of coconut fat, palm kernel fat of the same melting point or a mixture of both is used.

Other fats which are at room-temperature in a solid state and which are known as ingredients for fillings can be used in the same way. If these fats have another melting point as the above mentioned fats, the duration and the temperature of the supercooling as well as the duration and the temperature of cooling after pouring onto the strip of the baked pastry must be varied according to the desired characteristics of the filling.

Other ingredients than sugar, ground wafers and cocoa powder can be used. These ingredients are well known in the art.

It is known to stir and loosen the filling by blowing air or an inert gas into it. In the present process this blowing air or gas into the filling is found to be advantageous to assist supercooling. Therefore a cooler gas is blown into the filling. A preferred gas used in the present process is nitrogen since this has no chemical effect on the fat of the filling at the working temperature. It has also been found particularly advantageous to carry out the whole process of the invention in an atmosphere of nitrogen.

Supercooling of the filling can be efficiently carried out in a cooling machine of the type known as a "Votator" or "Schröder-Kombinator." In these cooling machines the filling is stirred under cooling and the solidifying parts of the fat are scraped by knives from the inner walls of the cooling machine on which such solidifying parts of the fat or the mixture will adhere. Into the cooling machine the cooled gas, preferably nitrogen, can be blown for stirring and loosening the filling and for assisting the supercooling. By the use of such a cooling machine the filling can be cooled to such an extent that it solidifies almost immediately after pouring. As an aid to the cooling process or controlling the cooling, the ingredients to be mixed may be cooled, thus enabling the pouring temperature of the mixture to be achieved without other means of cooling.

Advantages of the process described, in addition to those outlined above include the fact that cooling of the product after the filling has been poured is reduced by a substantial amount and in some cases is eliminated. Temperature changes to which the filling has previously been subjected can be avoided, as the solidification of the fat by the manufacturer prior to its delivery to the user is no longer necessary.

The process using fat in liquid state in the mixing stage makes it possible to carry out the process continuously instead of in a batch process as has hitherto been necessary.

The surprising result has been obtained that although the mixing temperature is greater than hitherto, a shorter run and quicker cooling time after pouring is achieved.

The filling when mixed is in a more homogeneous condition and the nitrogen used is thus more uniformly distributed while the mixture is in the semi-solidified state and the filling adheres more readily to the pastry. This application is a continuation-in-part of application Serial No. 720,562, filed March 11, 1958 and now abandoned.

What I claim is:

1. A method of making baked pastry products which comprises melting a fat which is solid at room temperatures; mixing the melted fat with a pastry filling containing essentially flour, sugar and flavoring; then supercooling the mixture to a temperature below the solidification point of said fat; pouring the supercooled mixture while still liquid onto a strip of baked pastry to form a coating thereon; and then further cooling the assembly to cause said mixture to set on said baked pastry.

2. A method according to claim 1, in which said fat is of the coconut type.

3. A method according to claim 1, in which the temperature of mixing is about 33°–37° C.

4. A method according to claim 1 in which the temperature of super-cooling is below 27° C.

5. A method according to claim 1, in which the temperature of super-cooling is between 18° and 27° C.

6. A method according to claim 1, in which an inert gas is blown through the mixture during the super-cooling.

7. A method according to claim 1, in which the mixture is stirred during the super-cooling.

References Cited in the file of this patent

UNITED STATES PATENTS

| | | |
|---|---|---|
| Re. 23,484 | Johnson | Apr. 29, 1952 |
| 2,163,913 | Otterbacher | June 27, 1939 |
| 2,674,534 | Carter | Apr. 6, 1954 |